\n

United States Patent
Hickethier et al.

(10) Patent No.: US 7,680,498 B2
(45) Date of Patent: Mar. 16, 2010

(54) METHOD FOR REVERSE SIGNALLING FOR A TRANSMISSION SERVICE WHICH IS TO BE USED DURING A MOBILE TERMINATED-PSTN/ISDN ORIGINATED-CALL

(75) Inventors: Thomas Hickethier, Berlin (DE); Jens Hofmann, Schildow (DE); Norbert Klehn, Falkensee (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 615 days.

(21) Appl. No.: 10/575,237

(22) PCT Filed: Sep. 30, 2004

(86) PCT No.: PCT/DE2004/002227

§ 371 (c)(1), (2), (4) Date: Apr. 10, 2006

(87) PCT Pub. No.: WO2005/036904

PCT Pub. Date: Apr. 21, 2005

(65) Prior Publication Data

US 2007/0135126 A1    Jun. 14, 2007

(30) Foreign Application Priority Data

Oct. 10, 2003   (DE) ................. 103 47 967

(51) Int. Cl.
*H04Q 7/20* (2006.01)
(52) U.S. Cl. .............. 455/445; 370/354; 370/355; 370/356; 370/353
(58) Field of Classification Search ........... 455/406, 455/445; 370/480, 351, 352, 354, 355, 356, 370/357
See application file for complete search history.

(56) References Cited

U.S. PATENT DOCUMENTS 5,572,524 A * 11/1996 Harada et al. ............ 370/468

(Continued)

FOREIGN PATENT DOCUMENTS

GB    2 347 305     8/2000

(Continued)

OTHER PUBLICATIONS

3GPP TS 29.007, V5.7.0, 3$^{rd}$ Generation Partnership Project; Technical Specification Group Core Network; General requirements on interworking between the Public Land Mobile Network (PLMN) and the Integrated Services Digital Network (ISDN) or Public Switched Telephone Network (PSTN); XP002318648; Sep. 2003 (Release 5); Sophia Antipolis; pp. 1-93.

(Continued)

*Primary Examiner*—Vincent P Harper
*Assistant Examiner*—Fred A Casca
(74) *Attorney, Agent, or Firm*—Staas & Halsey LLP

(57) ABSTRACT

A method for the reverse signaling of a transmission service is used during a call from a first telecommunication network. A mobile terminal is called in the supply range of a target switchboard of a digital mobile radio network from the first telecommunication network, and the information completely describing the transmission service which is to be used is exchanged between the mobile terminal and the destination mobile switchboard of the digital mobile radio network, is stored in the destination mobile switchboard and is transported by at least one signaling message ADDRESS COMPLETE, ANSWER to at least one access mobile switchboard involved in the call which to be made, whereupon it is made available.

8 Claims, 1 Drawing Sheet

U.S. PATENT DOCUMENTS

| | | | |
|---|---|---|---|
| 2003/0027570 A1* | 2/2003 | Yang et al. | 455/432 |
| 2003/0099341 A1* | 5/2003 | Williams | 379/211.02 |
| 2003/0233457 A1* | 12/2003 | Basilier et al. | 709/227 |
| 2004/0076145 A1* | 4/2004 | Kauhanen et al. | 370/352 |
| 2004/0198326 A1* | 10/2004 | Hirani | 455/414.1 |

FOREIGN PATENT DOCUMENTS

| | | |
|---|---|---|
| RU | 2 163 059 | 2/2001 |
| WO | 96/34504 | 10/1996 |
| WO | 97/12490 | 4/1997 |
| WO | WO 03/049477 A | 6/2003 |
| WO | WO 2004/100482 | 11/2004 |

OTHER PUBLICATIONS

3GPP TS 29.007, V5.8.0, 3$^{rd}$ Generation Partnership Project; Technical Specification Group Network; General requirements on interworking between the Public Land Mobile Network (PLMN) and the Integrated Services Digital Network (ISDN) or Public Switched Telephone Network (PSTN); XP002318651; Dec. 2003 (Release 5); Sophia Antipolis; pp. 1-94.

T-Mobile, Siemens: "NP-030431; Inter-network accounting for BS30 based services such as video telephony"; Technical Specification Group CN, TSG-CN, No. 21, "Online!"; XP 002318649; Sep. 17, 2003; T-Mobile, Vodafone; pp. 1-2.

T-Mobile, Siemens: "N3-030821; Change Request for 29.007, CR89, rev4, current version 5.7.0, backward signaling of service information between VMSC and GMSC for MTC", 3GPP TSG-CN WG3, Meeting No. 30, "Online!"; XP 002318650; Oct. 27, 2003; T-Mobile, Vodafone; pp. 1-11.

3GPP TS 24.008, Sections 10.5.4.5, 10.5.4.5.1, 9.3.2.2 and 9.3.23.1.

3GPP TS 29.007 v3.11.0 (Dec. 2002); Paragraph 10.2.2.6.

* cited by examiner

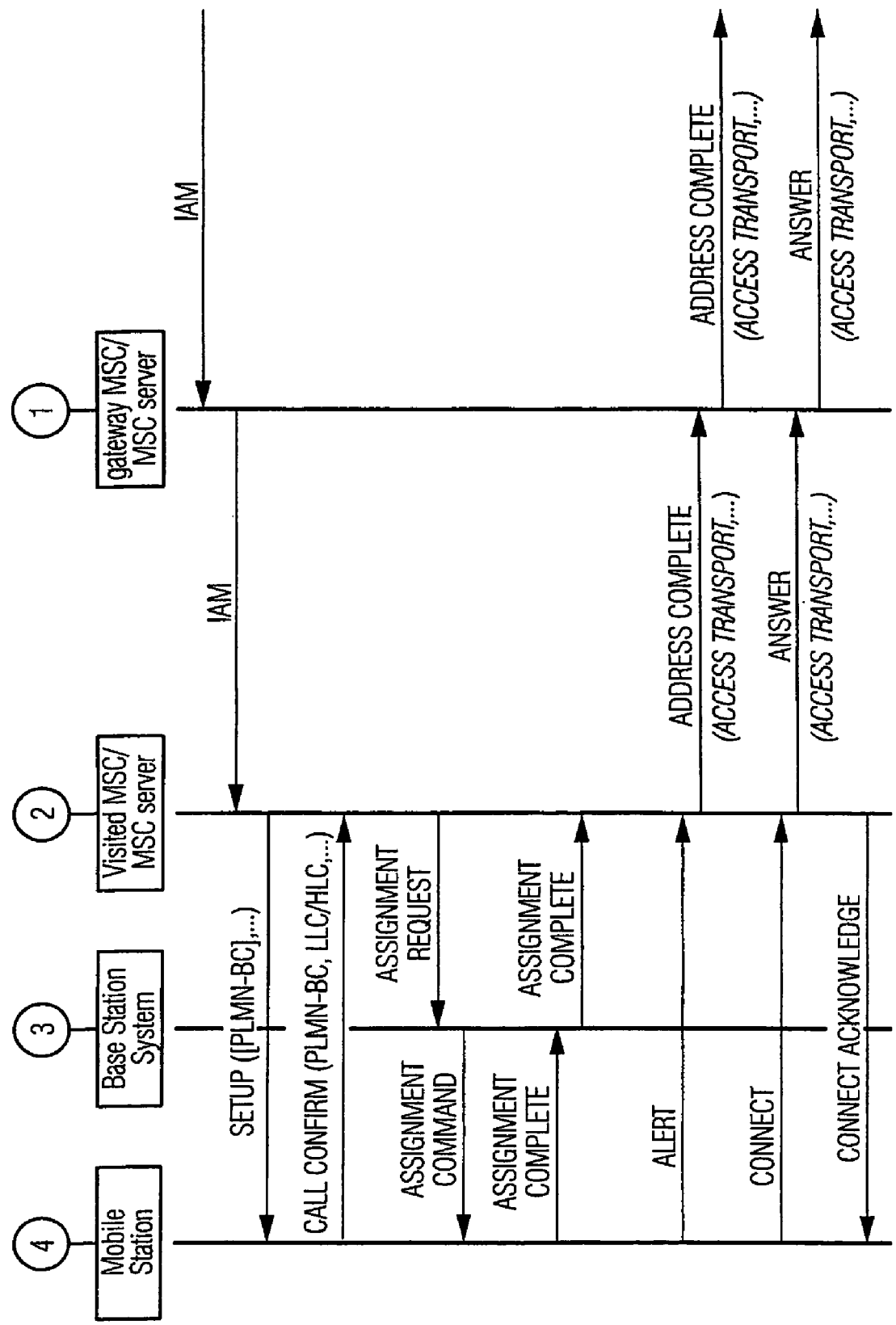

METHOD FOR REVERSE SIGNALLING FOR A TRANSMISSION SERVICE WHICH IS TO BE USED DURING A MOBILE TERMINATED-PSTN/ISDN ORIGINATED-CALL

CROSS REFERENCE TO RELATED APPLICATIONS

This application is based on and hereby claims priority to International Application No. PCT/DE2004/002227 filed on Sep. 30, 2004 and German Application No. 103 479 67.8 filed on Oct. 10, 2003, the contents of which are hereby incorporated by reference.

BACKGROUND OF THE INVENTION

The present invention relates to a method for backward-signaling of a transmission service which is to be used for a call which is to be set up from a telecommunication network, where the call enters a mobile radio network. When a telecommunication terminal sets up a call to another telecommunication terminal, with the called telecommunication terminal being in the service area of a mobile radio network and the calling telecommunication terminal being in the service area of another telecommunication network, it is generally possible that a transmission service which the calling telecommunication terminal requires cannot be clearly identified in the mobile radio network of the called telecommunication terminal. Accordingly, the selection of a specific transmission service is down to the called telecommunication terminal or the relevant subscriber. On the basis of the related art, the transmission service selected by the called telecommunication terminal is not transmitted to all network nodes which are involved in a call which is to be set up or in a data transmission which can be performed. In a mobile radio network, this particularly means that the access mobile switching centers involved in a call which is to be set up, such as a "Gateway MSC" (Mobile Switching Center) or a "Gateway MSC Server", which act as connecting network nodes between the mobile radio network and other telecommunication networks, receive no information about the transmission service which is actually to be used for a call entering the mobile radio network, that is to say an "MTC" (Mobile Terminated Call). Accordingly, the access mobile switching centers, such as the "Gateway MSC" and the "Gateway MSC Server", cannot execute any transmission-service-specific functions. Examples of such transmission-service-specific functions are blocking of particular transmission services, either generally or just for selected connected telecommunication networks, or provision of information about the selected transmission service at this access mobile switching center or at this connecting network node, such as billing information for subscriber or intermediate-network billing.

To date, the calling telecommunication terminal specifies a transmission service it requires by setting particular values in a "Bearer Capability" information element (BC). In addition, bearer services can be described using a "Low Layer Compatibility" information element (LLC) and teleservices can be described using a "High Layer Compatibility" information element (HLC). While LLC and HLC are transmitted unchanged between the telecommunication terminals by transmission networks involved in the transmission or in the call which is to be set up, the BC is valid only in the respective transmission network and is converted, if appropriate, at the network boundary between the transmission networks in question. For this reason, a distinction is also drawn between a PLMN-BC for the mobile radio network and an ISDN-BC for an ISDN landline network as a further telecommunication network. Mobile-radio-specific parameters, including message types, for example, are specified in 3GPP TS 24.008 and 3GPP TS 48.008. ISDN-related parameters and values and also message types can be found in ITU-T Q.760-769 and ITU-T Q.931.

In the case of a call from a landline network to a mobile radio network, as is to be considered here, these parameters are to date transmitted in an "IAM" message (Initial Address Message) when the call is set up, as defined for the "ISUP" in ITU-T Q.760-769. Generally, these parameters are not complete or are missing entirely. However, one cause of this may be that the calling telecommunication terminal provides information about the parameters only incompletely, for example. The quantity of parameters required for describing a transmission service is defined in different ways for different networks. Whereas the GSM standard in a mobile radio network is very restrictive and requires a multiplicity of parameters (3GPP TS 27.001), there are no specific stipulations in an ISDN network using the "ISUP" control mechanism. In addition, there are also different products which set the parameters in different ways. It is also conceivable for a transmission network which is likewise involved in the call setup to transmit the information regarding the parameters possibly only in part or not all. Furthermore, it is possible that the call comes from an analog landline network (PSTN). In this case, the transmission service is not signaled when a call is set up. In analog networks, a call is set up and then the transmission service is flagged at the start of the transmission. To this end, the telecommunication terminals interchange signal tones such as can be heard for a fax transmission, for example. When changing from an analog to a digital telecommunication network, a BC is then often produced which then contains only the information "3.1 kHz Audio", for example. The BC is therefore incomplete.

A mobile radio network, such as a GSM or UMTS network, for example, in which a call is incoming is already aware of various methods for identifying a transmission service required by a calling telecommunication terminal. First, there is a "multi-numbering method" for this. This involves the transmission service being identified by an appropriate call number, since in this case each transmission service which the telecommunication terminal or the relevant subscriber is authorized to use is assigned its own call number in the mobile radio network. A "Home Location Register (HLR)" in the mobile radio network manages the call numbers associated with the respective transmission services and stores PLMN-BCs belonging to these. The PLMN-BC belonging to the call number associated with a particular transmission service is transmitted to the called telecommunication terminal. That is to say that the PLMN-BC associated with the identified transmission service is communicated to the called telecommunication terminal via a destination mobile switching center, known as a "Visited MSC", or via a "Visited MSC Server". The access mobile switching centers through which it passes, namely a "Gateway MSC" or a "Gateway MSC Server", can in this case optionally be informed about the respective transmission service. In this context, they are supplied with a code which is specific to the respective transmission service. This practice is described in 3GPP TS 29.002, for example. However, this code does not describe the relevant transmission service sufficiently accurately to be able to provide transmission-service-specific functions on the "Gateway MSC" or the "Gateway MSC Server". The code is therefore too inaccurate, since it makes no statements about a resource allocation in the mobile radio network as requested by the call which is to be set up. In addition, various transmission services need to be distinguished which bear the same code. Examples which may be mentioned in this context are a general synchronous transmission service and a synchronous transmission service for multimedia—both bear the code for BS30, as defined in 3GPP TS 22.002 and 3GPP TS 29.002.

In addition, there is a "single-numbering method", which attempts to map a PLMN-BC from an ISDN-BC. This procedure is not always successful, however, for example because the ISDN-BC is incomplete or too inaccurate. The called telecommunication terminal then receives no information about the required transmission service, with the exception of a possible incomplete backup BC, as explained in 3GPP TS 24.008 and 3GPP TS 29.007. The transmission service to be used for the call which is to be set up is then ultimately selected by the called telecommunication terminal.

In both methods described, however, the situation is that parameters which define the transmission service to be used are negotiated between the "Visited MSC" or the "Visited MSC Server" and the called telecommunication terminal. This is described in 3GPP TS 27.001 and 3GPP TS 29.007. Following receipt of the "assignment complete" message, the "Visited MSC" or the "Visited MSC Server" contains the information about the transmission service which is to be used. Hence, on the basis of the related art, the complete information about the transmission service to be used is available only in the "Visited MSC" or the "Visited MSC Server" following receipt of the "call complete" message from the called telecommunication terminal and following receipt of the "assignment complete" message from the "BSS" (Base Station System).

In addition, at the TSG CN-#-21 standardization meeting from Sep. 17.-Sep. 19, 2003, a document NP-030431 about "internetwork accounting for BS30-based services such as video" presented a solution which can be used to provide billing information to a network boundary between a mobile radio network and a landline network. This solution makes use of apparently unused bits of an "Optional Backward Call Indication" parameter contained in the "Address Complete Message (ACM)" or "Answer Message (ANM)" ISUP messages. This solution can be used only conditionally, however, since the 4 free bits of the "Optional Backward Call Indication" parameter are insufficient to be able to provide all requested transmission-service-specific functions on a "Gateway MSC" or a "Gateway MSC Server". In addition, these bits are already used in some national applications and are therefore not available without restriction.

SUMMARY OF THE INVENTION

One possible object of the present invention was to provide a method which can be used to communicate complete information about a transmission service which is to be used for a call which is to be set up and which is incoming in a mobile radio network to an access mobile switching center in the mobile radio network, such as a "Gateway MSC" or a "Gateway MSC Server", as are described in 3GPP TR 21.905 and 3GPP TS 23.002.

The inventors propose a method for backward-signaling of a transmission service which is to be used for a call which is to be set up from a first telecommunication network, in which a mobile terminal in the service area of a digital mobile ratio network is called from the first telecommunication network, information completely describing the transmission service which is to be used is negotiated between the mobile terminal and a destination mobile switching center (Visited MSC) in the digital mobile ratio network, is stored in the destination mobile switching center (Visited MSC), and is transported using at least one signaling message at least to an access mobile switching center (Gateway MSC) involved in the call which is to be set up, and is made available there.

In one particularly preferred embodiment of the method, the first telecommunication network used is an ISDN network, a PSTN network or a mobile radio network (PLMN). The digital mobile radio network is preferably a GSM network or a UMTS network. The method can be applied to calls in which a mobile telecommunication terminal is called in the service area of this digital mobile radio network. In this context, reference is made to "mobile terminated calls".

The method allows the information completely describing the transmission service which is to be used to be transported from the destination mobile switching center, such as a "Visited MSC" or a "Visited MSC Server", at least to an access mobile switching center, such as a "Gateway MSC" or a "Gateway MSC Server". By way of example, the information completely describing the transmission service which is to be used may comprise:
  a PLMN-BC information element contained in a "Call Confirmed" message from the mobile telecommunication terminal,
  a modification for a PLMN-BC information element with information from an "Assignment Complete" message which has arrived in the destination mobile switching center,
  a PLMN-BC information element converted into an ISDN-BC information element,
  an LLC and/or HLC.

In one particularly preferred embodiment of the method, the information completely describing the transmission service which is to be used is transported to the access mobile switching center using at least one ISUP message, namely an "Address Complete Message (ACM)", an "Answer Message (ANM)", a "Connect Message (CON)" or a "Call Progress Message (CPG)". Preferably, this involves the use of an optional parameter, an "Access Transport". This means that the information completely describing the transmission service which is to be used is stored or made available in an optional "Access Transport" parameter in the at least one ISUP message.

In another preferred embodiment of the method, the information completely describing the transmission service which is to be used is evaluated in the access mobile switching center in order to be able to execute transmission-service-specific functions contained therein.

In another preferred embodiment of the method, the information completely describing the transmission service which is to be used is additionally transmitted to other network nodes in the digital mobile radio network or in the first telecommunication network which are involved in the call which is to be set up. This means that the information completely describing the transmission service which is to be used can be transported beyond the network boundary of the mobile radio network. This could be used for billing purposes, for example. A call is paid for by a subscriber on a relevant calling telecommunication terminal. He is billed by a network operator who is responsible for him. The individual network operators have agreements regarding how a respective destination network operator is paid for his services. There are now services, such as video, for which the respective destination network operator needs to provide far more resources than for normal telephony. For such services, the destination network operator will also incur higher charges. To determine such situations, that is to say the performance of such a service, the destination network operator can send relevant information from the interworking service to the network operator responsible for the calling subscriber beyond his own network boundary.

Preferably, the information completely describing the transmission service which is to be used is transmitted transparently from other network nodes within the mobile radio network which are involved in the call, that is to say without changes, when the information completely describing the transmission service which is to be used is to be made available to the access mobile switching center, that is to say particularly the "Gateway MSC" or the "Gateway MSC Server".

In addition, these network nodes involved may also evaluate the information completely describing the transmission service which is to be used, however, in order to be able to execute transmission-specific functions.

The access mobile switching center, particularly the "Gateway MSC" or the "Gateway MSC Server", can use the information completely describing the transmission service which is to be used which (information) is backward-signaled in this way to influence the rest of call setup or to make this information available to other network elements. This information can also be stored in relevant billing data generated at a network node.

In another preferred embodiment of the method, the information completely describing the transmission service which is to be used comprises a "Bearer Capability" information element (BC), a Low Layer Compatibility information element (LLC) and/or a High Layer Compatibility information element. In this case, a BC may be coupled to an LLC (for bearer services, such as data transmission with a modem) or to an HLC (for teleservices, such as in the case of a fax).

The method allows the access mobile switching center, such as a "Gateway MSC" or a "Gateway MSC Server", to receive the information completely describing the transmission service which is to be used. In this case, the method preferably uses the option of ISUP signaling, which is installed between the components involved. Conversion of a PLMN-BC information element into an ISDN-BC information element is an available functionality of an access mobile switching center, such as an MSC or an MSC Server. However, this functionality has to date not been used for backward-signaling of a transmission service which is to be used.

Similarly, the ISUP control mechanism contains a description of the possibility of transporting both an ISDN-BC information element and the information elements LLC and HLC in the optional parameter "Access Transport" of the ISUP messages "Address Complete Message", "Answer Message", "Connect Message" or "Call Progress Message". By contrast, transporting a PLMN-BC information element requires expansion of the ISUP control mechanism. There is currently no provision in the ISUP control mechanism for transporting non-ISUP-specific elements. The ISUP control mechanism would need to be expanded such that it is permissible to transport non-ISUP-specific elements, particularly a PLMN-BC element, preferably in the "Access Transport" parameter. This produces the advantage that mobile-radio-specific parameters can be provided. This is particularly valuable when it is necessary to demonstrate resources which are in use, such as a plurality of radio channels which are being used, a channeling coding which is being used or a radio transmission rate which is being used. This opportunity to transport said information elements is currently not used for backward-signaling of an actually used transmission service for a call which is to be set up between a "Visited MSC" or a "Visited MSC Server" and a "Gateway MSC" or a "Gateway MSC Server".

Using the information completely describing the transmission service which is to be used, the "Gateway MSC" or the "Gateway MSC Server" is able, by way of example to influence the rest of call setup, for example to prevent call setup. In addition, this allows the information completely describing the transmission service which is to be used to be forwarded to connected network elements in other telecommunication networks or else allows the information completely describing the transmission service which is to be used to be made available elsewhere, such as for billing data.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a schematic illustration of a sequence in one potential embodiment of the inventive method.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 1 shows a sequence in one potential embodiment of the inventive method in schematic form. It shows an access mobile switching center 1 in a digital mobile radio network, in this case a "Gateway MSC" or a "Gateway MSC Server". In addition, a destination mobile switching center 2, in this case a "Visited MSC" or a "Visited MSC Server", a base station system (BSS) 3 and a mobile station 4 are shown. For the sake of clarity, only the network elements which are fundamental to the sequence of the method have been shown. The mobile station 4 is now called by a telecommunication terminal (not shown) situated outside the mobile radio network, that is to say that this is a call entering the mobile radio network, a "Mobile Terminated Call". This involves an IAM message (Initial Address Message) being sent to the access mobile switching center 1 in order to initiate an assignment for an incoming call. The IAM message is a specific message from the ISUP (ISDN User Part), transporting the information which describes the required transmission service. The access mobile switching center 1 forwards the IAM message to the destination mobile switching center 2. If possible, the destination mobile switching center 2 produces a mobile-radio-specific Bearer Capability information element PLMC-BC. Methods and obstacles in this regard have already been described above. The destination mobile switching center 2 then sends a setup or installation message, possibly containing a PLMN-BC, to the mobile station 4. The mobile station 4 can modify the PLMN-BC received according to defined rules or must generate and provide a complete PLMN-BC if the destination mobile switching center 2 was not able to produce a PLMN-BC. The mobile station 4 responds with a "Call Confirm" confirmation message. This confirmation message comprises, inter alia, a mobile-radio-network-specific Bearer Capability information element PLMN-BC, which transmits mobile-radio-specific parameters to the destination mobile switching center 2. In addition, the mobile station 4 provides an LLC or HLC on the basis of service. The destination mobile switching center 2 also sends an "Assignment Request" message to the BSS 3, that is to say an assignment request message for the call which is to be set up. The BSS 3 then forwards an "Assignment Command" message to the mobile station 4. The mobile station 4 responds with an "Assignment Complete" message in order to confirm the assignment. This message is forwarded to the destination mobile switching center 2 via the BSS 3. The destination mobile switching center 2 now has all the information completely describing the transmission service which is to be used and can prepare it for transmission to the access mobile switching center 1. For this, it can use the PLMN-BC or can convert the PLMN-BC into an ISUP-compliant ISDN-BC. In addition, an LLC or an HLC can be provided. When the mobile station 4 signals that it is ready to take a call in an "Alert" message, that is to say that the relevant subscriber is called, and in a "Connect" message, that is to say that the subscriber has taken the call, the destination mobile switching center 2 then sends an "Address Complete" message and an "Answer" message to the access mobile switching center 1. What is not shown in FIG. 1, for reasons of clarity, is that, under certain conditions described in the ISUP standards, a "Connect" message can be sent instead of an "Address Complete" message. This is done when the "Alert" message does not appear. In addition, a "Call Progress" message may also be used when conditions change during the call, such as in the case of alternative services. Such an event is initialized by a "Modify" message from the mobile station 4. An optional "Access Transport" parameter in these messages contains all the information which completely describes the transmission service which is to be used. This information completely describing the transmission service which is to be used can also be forwarded beyond the boundaries of the mobile radio network, as indicated. The information completely describing the transmission service which is to be used is now available in the access mobile switching center 2. Preferably, the access mobile switching center 2 evaluates the information such that the access mobile switching center 2 can execute transmission-service-specific functions. In this case, the access mobile switching center 2 is able, by way of example, to influence the rest of call setup, for example to prevent call setup. In addition, the information completely describing the transmission service which is to be used may also be made available elsewhere, for example for billing which is to be performed. Finally, the destination mobile switching center 2 confirms the call setup in a "Connect Acknowledge" message, and data can be transmitted.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method of backward-signaling of a transmission service to be used, for setting up a call from a telecommunication network, comprising:
 calling, from the telecommunication network, a mobile terminal in a service area of a destination mobile switching center in a digital mobile radio network via an access mobile switching center;
 sending an initial Bearer Capability from the destination mobile switching center to the mobile terminal;
 negotiating, between the mobile terminal and the destination mobile switching center, information describing the transmission service to be used for the call so as to revise the initial Bearer Capability and determine a revised Bearer Capability;
 converting the revised Bearer Capability at the destination mobile switching center, the revised Bearer Capability being converted into an Integrated Services Digital Network (ISDN) User Part (ISUP)-compliant (ISDN-BC) information element; and
 transporting the Integrated Services Digital Network (ISDN) User Part (ISUP)-compliant (ISDN-BC) information element from the destination mobile switching center to the access mobile switching center using at least one ISUP message
 wherein the telecommunication network is an ISDN, a Public Switched Telephone Network (PSTN), or a Public Land Mobile Network (PLMN), and
 wherein call setup is not completed until after the Integrated Services Digital Network (ISDN) User Part (ISUP)-compliant (ISDN-BC) information element is transported to the access mobile switching center.

2. The method according to claim 1, wherein the at least one ISUP message is an Address Complete Message (ACM), an Answer Message (ANM), a Connect Message (CON), or a Call Progress Message (CPG).

3. The method according to claim 1, wherein the information describing the transmission service is made available in an optional Access Transport parameter in the at least one ISUP message.

4. The method according to claim 1, wherein the information describing the transmission service is evaluated in the access mobile switching center in order to execute transmission service specific functions contained therein.

5. The method according to claim 1, further comprising transmitting the information describing the transmission service to at least one network node in the digital mobile radio network or in the telecommunication network to be involved in the call.

6. The method according to claim 1, wherein the information describing the transmission service comprises a Low Layer Compatibility information element (LLC) or a High Layer Compatibility information element (HLC).

7. A system in which a transmission service is backward-signaled, comprising:
 a destination mobile switching center in a digital mobile radio network, the destination mobile switching center having a service area;
 a mobile terminal in the service area; and
 a telecommunication network calling the mobile terminal via an access mobile switching center, the telecommunication network being an ISDN, a Public Switched Telephone Network (PSTN), or a Public Land Mobile Network (PLMN), wherein
 the destination mobile switching center sends an initial Bearer Capability to the mobile terminal;
 the mobile terminal and the destination mobile switching center negotiate information describing a transmission service to be used for a call to be set up between the telecommunication network and the mobile terminal, so as to revise the initial Bearer Capability and determine a revised Bearer Capability,
 the destination mobile switching center converts the revised Bearer Capability into an Integrated Services Digital Network (ISDN) User Part (ISUP)-compliant (ISDN-BC) information element,
 the Integrated Services Digital Network (ISDN) User Part (ISUP)-compliant (ISDN-BC) information element is transported using at least one ISUP message, from the destination mobile switching center to the access mobile switching center to effect the backward signaling, and call setup is not completed until after the Integrated Services Digital Network (ISDN) User Part (ISUP)-compliant (ISDN-BC) information element is transported to the access mobile switching center.

8. A destination mobile switching center in a digital mobile radio network for communicating between an access mobile switching center and a mobile terminal within a service area of the destination mobile switching center, the destination mobile switching center comprising:

a negotiation unit to send an initial Bearer Capability to the mobile terminal, to negotiate information describing a transmission service to be used for a call to be set up between a telecommunication network and the mobile terminal, and to revise the initial Bearer Capability and determine a revised Bearer Capability;

a conversion unit to convert the revised Bearer Capability into an Integrated Services Digital Network (ISDN) User Part (ISUP)-compliant (ISDN-BC) information element; and a transmitter to transmit the Integrated Services Digital Network (ISDN) User Part (ISUP)-compliant (ISDN-BC) information element using at least one ISUP message to the access mobile switching center to effect the backward signaling, wherein the telecommunication network is an ISDN, a Public Switched Telephone Network (PSTN), or a Public Land Mobile Network (PLMN), and call setup is not completed until after the Integrated Services Digital Network (ISDN) User Part (ISUP)-compliant (ISDN-BC) information element is transmitted to the access mobile switching center.

* * * * *